United States Patent
Severin

(10) Patent No.: US 9,718,342 B2
(45) Date of Patent: Aug. 1, 2017

(54) HYBRID DRIVE FOR A VEHICLE

(71) Applicant: FEV GmbH, Aachen (DE)

(72) Inventor: Christopher Severin, Braunschweig (DE)

(73) Assignee: FEV Europe GmbH, Aachen (DE)

( * ) Notice: Subject to any disclaimer, the term of this patent is extended or adjusted under 35 U.S.C. 154(b) by 10 days.

(21) Appl. No.: 14/650,618

(22) PCT Filed: Nov. 18, 2013

(86) PCT No.: PCT/EP2013/074112
§ 371 (c)(1),
(2) Date: Jun. 9, 2015

(87) PCT Pub. No.: WO2014/090517
PCT Pub. Date: Jun. 19, 2014

(65) Prior Publication Data
US 2015/0314774 A1    Nov. 5, 2015

(30) Foreign Application Priority Data

Dec. 11, 2012    (DE) .................. 10 2012 112 091

(51) Int. Cl.
*B60W 20/00* (2016.01)
*B60K 6/24* (2007.10)
(Continued)

(52) U.S. Cl.
CPC ............... *B60K 6/24* (2013.01); *B60W 10/06* (2013.01); *B60W 10/08* (2013.01); *B60W 20/16* (2016.01); *F01N 3/035* (2013.01); *F02B 37/00* (2013.01); *B60Y 2510/068* (2013.01); *B60W 2520/00* (2013.01); *B60W 2710/0666* (2013.01); *B60W 2710/083* (2013.01); *B60Y 2300/472* (2013.01);
(Continued)

(58) Field of Classification Search
None
See application file for complete search history.

(56) References Cited

U.S. PATENT DOCUMENTS

| 8,683,781 | B2 * | 4/2014 | Yacoub ................. | B60W 10/06 60/274 |
| 2004/0237513 | A1 | 12/2004 | Bunting et al. | |

(Continued)

FOREIGN PATENT DOCUMENTS

WO    2010052055 A1    5/2010

OTHER PUBLICATIONS

International Search Report dated Jan. 22, 2014, International Application No. PCT/EP2013/074112, International Filing Date Nov. 18, 2013.

*Primary Examiner* — Mussa A Shaawat
*Assistant Examiner* — Abdhesh Jha
(74) *Attorney, Agent, or Firm* — Dinsmore & Shohl LLP

(57) ABSTRACT

Hybrid drive for a vehicle, with a combustion engine and with at least one additional drive means, wherein an exhaust gas system with an exhaust gas post-treatment device and a turbine of an exhaust gas turbo-charger is provided for discharging the exhaust gases of the combustion engine and wherein the exhaust gas post-treatment device is arranged in the exhaust gas system in flow direction of the exhaust gases in front of the turbine, as well as a method for operating a hybrid drive.

16 Claims, 5 Drawing Sheets

(51) Int. Cl.
  *B60W 10/06* (2006.01)
  *B60W 10/08* (2006.01)
  *F02B 37/00* (2006.01)
  *F01N 3/035* (2006.01)
  *B60W 20/16* (2016.01)

(52) U.S. Cl.
  CPC ... *B60Y 2300/476* (2013.01); *B60Y 2400/435* (2013.01); *F01N 2340/06* (2013.01); *Y02T 10/144* (2013.01); *Y02T 10/54* (2013.01); *Y02T 10/6286* (2013.01); *Y02T 10/6295* (2013.01); *Y10S 903/905* (2013.01); *Y10S 903/93* (2013.01)

(56) References Cited

U.S. PATENT DOCUMENTS

| | | | |
|---|---|---|---|
| 2007/0277514 A1* | 12/2007 | Kammel | F01N 3/30 60/302 |
| 2008/0282674 A1 | 11/2008 | Gonze et al. | |
| 2009/0288392 A1 | 11/2009 | Yang et al. | |
| 2011/0005850 A1 | 1/2011 | Colvin et al. | |

\* cited by examiner

HYBRID DRIVE FOR A VEHICLE

CROSS-REFERENCE TO RELATED APPLICATIONS

This application is the U.S. national stage of PCT/EP2013/074112 filed Nov. 18, 2013, which claims priority of German Patent Application 10 2012 112 091.9 filed Dec. 11, 2012.

FIELD OF THE INVENTION

The invention relates to a hybrid drive for a vehicle, with a combustion engine and with at least one additional drive means, as well as a method for operating such a hybrid drive. A hybrid drive is to be understood as a hybrid drive system, which comprises at least one combustion engine and at least one additional drive means, like for example an electro motor or a flywheel mass, which are coupled to one another.

BACKGROUND OF THE INVENTION

An optimal operating point of such a hybrid drive is for example determined and adjusted in relation to the emission behavior or the fuel consumption of the drive. The publication document DE 10 2010 008 695 A1 describes a method, with which at any point of time an optimal operating point for a hybrid drive system can be determined and provided dependent on the torque demanded by the driver. The exhaust gas temperatures of combustion engines, especially diesel engines, are reduced because of such optimizations which generally increase the efficiency degree. Especially in hybrid drives, consumption reducing measures lead to a reduction of the exhaust gas temperature. An essential disadvantage of lower exhaust gas temperatures because of more efficient combustion engines is the slower cold starting heat-up of the exhaust gas post-treatment device. Furthermore, disadvantageously a lower passive filter regeneration is connected therewith, so that the filter regeneration intervals are shortened, wherein the heating-up of the filter for the soot burn-off in the regeneration operation is again connected with an increased fuel consumption.

SUMMARY OF THE INVENTION

An object of the invention is, to provide a hybrid drive with improved conditions for the regeneration operation of an exhaust gas post-treatment device.

The object is met according to the invention by the subject of patent claim 1. In the dependent claims, preferred embodiments and advantageous improvements are stated.

The hybrid drive according to the invention for a vehicle with a combustion engine and with at least one additional drive means has an exhaust gas system with an exhaust gas post-treatment device and a turbine of an exhaust gas turbo-charger for discharging the exhaust gases of the combustion engine. The additional drive means is preferably not a combustion engine. Especially preferred it is an electric motor, which does not exclude the use of other variants, like for example a hydraulic motor or a flywheel mass as an energy storage, in the sense of the invention. According to the invention, the exhaust gas post-treatment device is arranged in the exhaust gas system in flow direction of the exhaust gas in front of the turbine.

From this arrangement the advantage results, that the exhaust gas post-treatment device is loaded by exhaust gas, which has a higher pressure and a higher temperature than the exhaust gas after passing through the turbine. A temperature rise of the exhaust gas for starting a regeneration operation of the exhaust gas post-treatment device is, thus, facilitated in an advantageous manner. Because of the arrangement of the exhaust gas post-treatment device in front of the turbine, an increased exhaust gas temperature results at the inlet of the exhaust gas post-treatment device during the cold starting and during the warm-up. For the exhaust gas emissions this is of special importance, as the cold starting emissions have an especially large influence on the totally measured emissions in the so-called driving cycle, and gains even more importance in the cycle applied in the United States. By means of quicker warming-up of the exhaust gas post-treatment device, the conversion of the emitted pollutants starts, thus, at an earlier point of time in the warm-up phase, whereby the pollutant emission measured in the driving cycle is significantly reduced.

Because of the exhaust gas post-treatment device arranged in front of the turbine, the increase of the turbine inlet temperature is slowed down during a load step, whereby also the charging-air pressure increase is slowed down. With the hybrid drive according to the invention the possibility exits in advantageous manner, to compensate the delayed charging-air pressure increase, such that the missing torque which the combustion engine cannot provide sufficiently quickly, is provided by the additional drive means.

According to a preferred embodiment it is provided, that a control device for adjusting an operating point of the drive is connected to the combustion engine and to the additional drive means, wherein the adjustment of the operating point is carried out such, that a torque demand is fulfilled by a first torque of the combustion engine and a second torque of the additional drive means. This means, that the operating point includes a relationship of the first torque to the second torque. Concerning the combustion engine, the operating point can also determine different combustion processes, as this is described in publication document DE 10 2010 008 695 A1, the content of which is thus made reference to.

Furthermore, it is preferably provided, that a temperature of the exhaust gas post-treatment device influences the adjustment of the operating point by means of the control device. It is especially preferably provided, that at a temperature of the exhaust gas post-treatment device below a desired temperature, the adjustment of the operating point is carried out by the control device such, that during an increase of the torque demand a difference between the increased torque demand and the first torque of the combustion engine can be compensated by the second torque of the additional drive means. At a temperature of the exhaust gas post-treatment device above the desired temperature, thus the known optimization of the operating point can be carried out advantageously, as a compensation of the torque is not necessary.

During longer transient operation of the drive it is expected, that the temperature of the exhaust gas post-treatment device falls below the specified temperature, so that during increase of the torque demand, often or permanently the additional drive means will be used for support, whereby the energy storage would be excessively emptied. According to a further preferred embodiment, thus, it is provided, that at a temperature of the exhaust gas post-treatment device below a specified temperature, the adjustment of the operating point is carried out such by the control device, that an energy storage for feeding the additional drive means is charged, especially i.e. a battery for feeding the electric motor is charged by a generator or by the electric motor in the generation operation. Thus, the advantage is achieved, that discharging of the energy storage is also prevented during longer transient operation of the drive. Furthermore, the temperature of the exhaust gas post-treatment device is increased in an advantageous manner.

A further subject of the invention is a method for operating a hybrid drive, as described above. In the arrangement of the exhaust gas post-treatment device in flow direction of the exhaust gas in front of the turbine, the already described problem of a delayed responding turbo-charger results.

This problem is solved by the method according to the invention, such that a delayed response of the exhaust gas turbo-charger, due to the warming up of the exhaust gas post-treatment device, to an increased torque demand is compensated such, that a difference between the torque demand and a first torque of the combustion engine is provided by a second torque of the additional drive means. Thus, the advantages of the arrangement of the exhaust gas post-treatment device in front of the turbine can be used without having to accept its disadvantages.

Preferably it is provided, that a temperature of the exhaust gas post-treatment device is measured, wherein an operating point of the drive is adjusted dependent on the measured temperature. Preferably, at a temperature of the exhaust gas post-treatment device below a desired temperature, an energy storage for feeding the additional drive means is charged. This is at least valid for the case, that the torque demand is provided or can be provided by the first torque of the combustion engine. At a temperature of the exhaust gas post-treatment device above a desired temperature, the operating point of the drive is preferably adjusted in a consumption optimized manner.

BRIEF DESCRIPTION OF THE DRAWINGS

Following, the invention is described in detail by using the attached drawings and diagrams. The explanations also relate to the method according to the invention, as well as to the hybrid drive according to the invention. The exemplary description of embodiments does not limit the general inventive idea.

It shows

DETAILED DESCRIPTION OF THE INVENTION

Figure 1A:
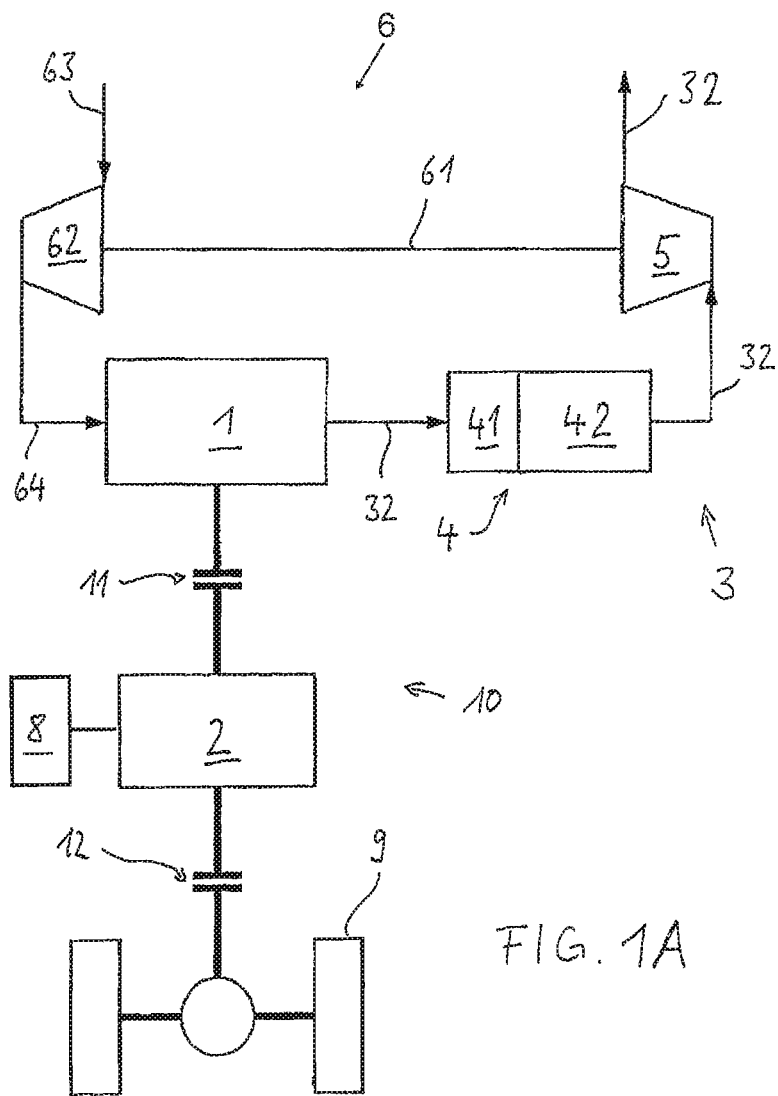
FIG. 1A an embodiment of the hybrid drive according to the invention for a vehicle in a schematical representation, FIG. 1B an embodiment of the hybrid drive according to the invention for a vehicle with a topology of the hybrid drive changed relative to FIG. 1A, in a schematical representation, FIG. 2 a detail of the embodiment of FIG. 1A, as well as three deviating embodiment variants of this detail, FIGS. 3, 4, and 5 respectively schematical diagrams for explaining the operation of the hybrid drive according to the invention and of the method according to the invention, FIG. 6 a preferred embodiment of the hybrid drive with a control device using a schematical representation of the control device, FIG. 7 a preferred embodiment of the method in a schematical representation.

In FIG. 1A a schematical representation of the hybrid drive 10 according to the invention for a vehicle 9 is only shown in outlines. Besides the hybrid drive 10, only a drive axle of the vehicle 9 is schematically shown. The hybrid drive 10 comprises a combustion engine 1 and an additional drive means 2. A drive train comprises clutches 11, 12, whereby it is intended to represent, that the vehicle 9 is selectively driveable by the combustion engine 1 or by the additional drive means 2 or by the engine 1 and the additional drive means 2 jointly. If the vehicle 9 is driven by the combustion engine 1 and by the additional drive means 2 together, thus a torque, driving the vehicle, results from the sum of a first torque of the combustion engine 1 and a second torque of the additional drive means 2. At the hybrid drive 10 shown in FIG. 1A, it is also provided, that the first torque of the combustion engine 1 can act on the drive axle A of the vehicle 9, which is designated as a parallel hybrid.

Figure 1B:
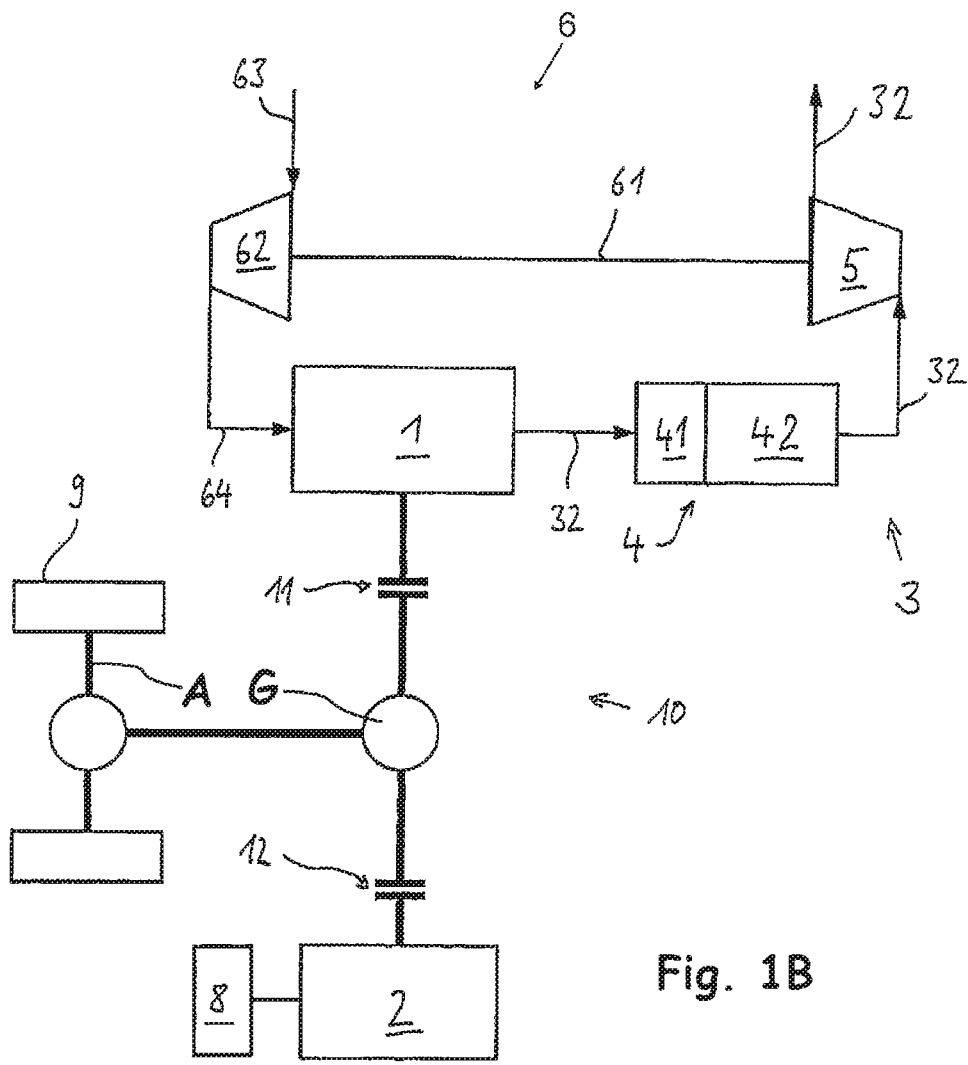

In FIG. 1B an embodiment of the hybrid drive 10 according to the invention for a vehicle 9 is schematically shown with a topology of the hybrid drive 10 changed in relation to FIG. 1A, which is more distinctly recognizable as a parallel hybrid, as the first and the second torque of the combustion engine 1 and of the additional drive means 2 are summed up in the gearbox G. Otherwise the representations of FIGS. 1A and 1B are the same and are described in the following together.

An exhaust gas system 3 is provided with an exhaust gas post-treatment device 4 and a turbine 5 of an exhaust gas turbo-charger 6 for discharging the exhaust gases of the combustion engine 1. According to the invention, the exhaust gas post-treatment device 4 is arranged in the exhaust gas system 3 in the flow direction of the exhaust gases, indicated by the arrows 32, in front of the turbine 5. The turbine 5 is connected via a mechanical connection 61 in the known manner to the supercharger 62, which compresses the intake air 63. The compressed supercharged air is fed to the combustion engine 1, which is shown by the arrow 64.

The arrangement of the exhaust gas post-treatment device 4 in front of the turbine 5 enables in an advantageous manner higher temperatures of the exhaust gas post-treatment device 4, which facilitates for example a temperature rise in a regeneration operation. The pressures prevailing in front of the turbine 5 lead furthermore to a reduction of the exhaust gas volume and thus of the through flowing velocity in the exhaust gas post-treatment device 4 with the result of lower pressure losses. Because of the upstream arranged exhaust gas post-treatment device 4, the temperature rise of the turbine intake temperature is slowed down during a load step, whereby the charging-air pressure increase is slowed down. With the hybrid drive 10 according to the invention the possibility exists in an advantageous manner, to compensate the delayed charging- air pressure increase, in that the missing torque, which the combustion engine 1 cannot provide sufficiently quickly, is provided by the additional drive means 2.

The exhaust gas post-treatment device 4 has preferably a catalytic converter 41 and a particle filter 42 arranged downstream in flow direction of the exhaust gas. Further exhaust gas post-treatment devices 4 are described in the following in connection with FIG. 2.

The additional drive means 2 is preferably not a combustion engine. Especially preferred it is an electric motor 2, which, in the sense of the invention, does not exclude the use of different variants, like for example a hydraulic motor. An energy storage 8 is provided for feeding the additional drive means 2, i.e. for example a battery 8, which feeds the electro motor 2 and which is re-chargeable by a generator (not shown) or by the electric motor 2 in the generator operation state, wherein the generator or the electric motor 2 is driven in the generator operation state for this by the combustion engine 1.

Figure 2:
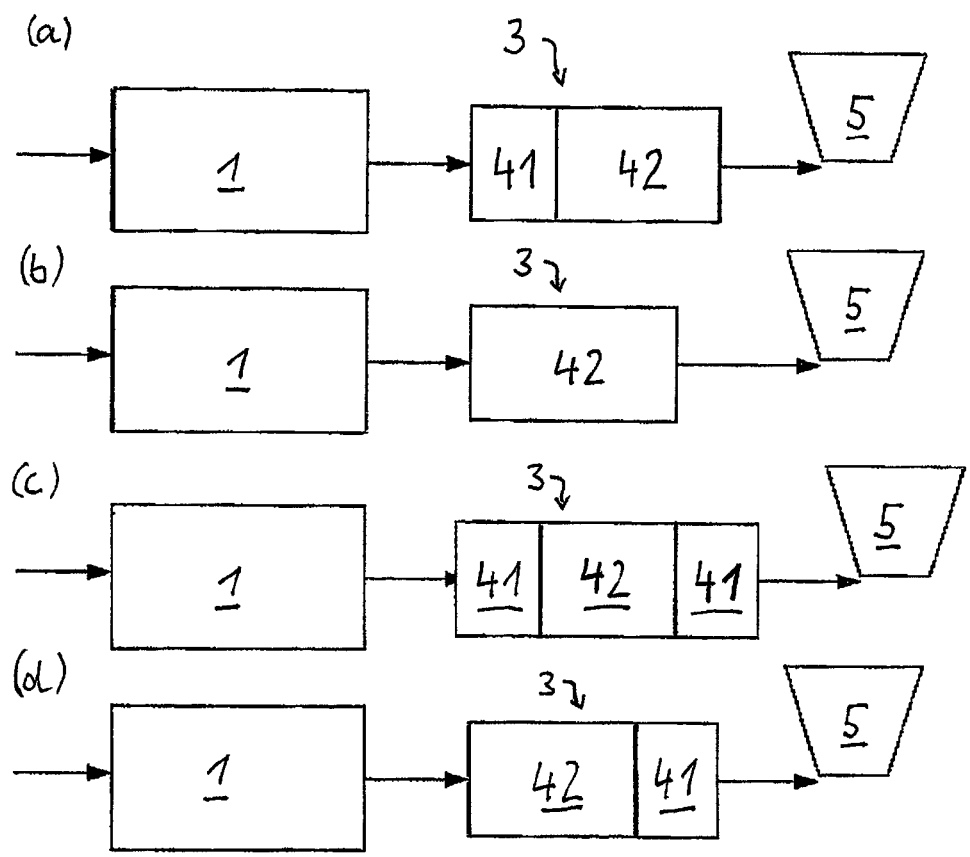

In FIG. 2, four variants of the exhaust gas system 3 of FIG. 1 are shown schematically, which are designated with the letters (a) to (d). The variant (a) corresponds in this case to the embodiment of the exhaust gas system 3 shown in FIG. 1 with components, like catalytic converter 41 and particle filter 42, arranged in flow direction behind one another. The variant (b) shows a simplified embodiment, in which the exhaust gas post-treatment device only consists of a particle filter 42. According to variant (c) it is provided, that the exhaust gas post-treatment device is constructed from a first catalytic converter 41, a particle filter 42 and a second catalytic converter 41, which are arranged in this sequence behind one another in flow direction of the exhaust gas. In variant (d) the catalytic converter 41 is arranged in flow direction of the exhaust gas behind the particle filter 42. In all described embodiments, the particle filter 42 can also be coated with a catalytic coating. The catalytic converter 41 or the catalytic particle filter coating can be formed as an oxidization catalytic converter, as a three-way catalytic converter or as a nitrogen oxide storage catalytic converter. Furthermore, the possibility exists, to put a further catalytic converter 42 in flow direction of the exhaust gas behind the turbine 5. The particle filter 42 and the catalytic converter 41 can be based in known manner on ceramic or metallic substrates.

Figure 3:
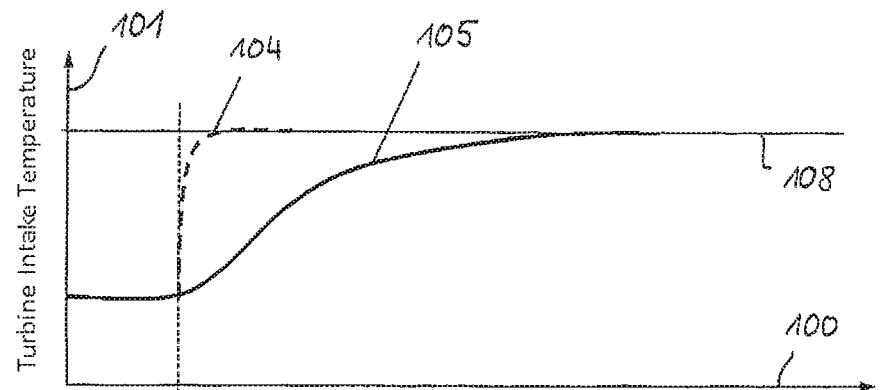
Figure 4:
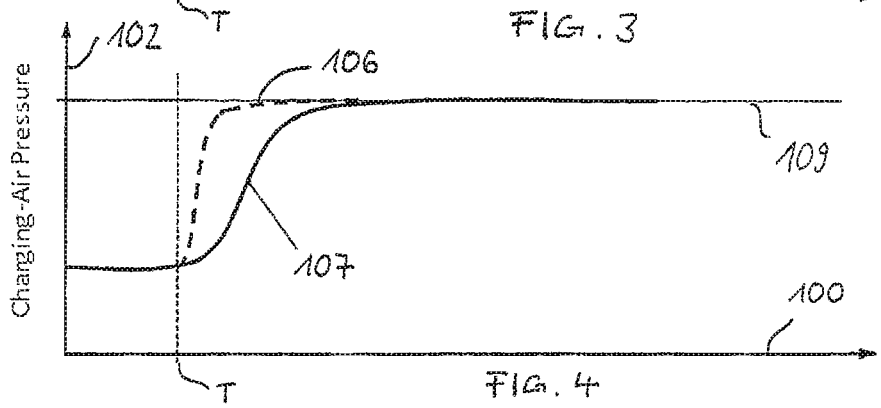
Figure 5:
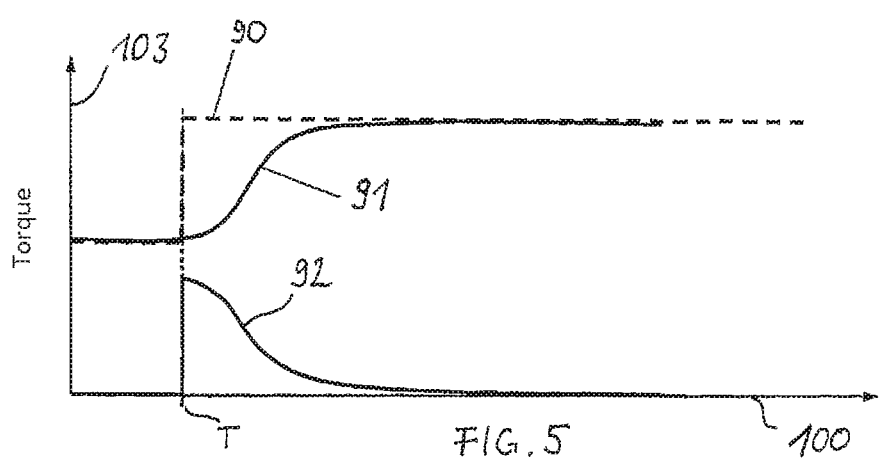

In FIGS. 3, 4 and 5 the load change process is shown in connection with the invention respectively using a diagram. In FIG. 3 the turbine intake temperature is shown on the ordinate 101 above the time on the axis of abscissa 100, wherein the point of time designated with T, is the point of time of the load step. The curve 104 shows the development of the turbine intake temperature in an exhaust gas system 3 without an exhaust gas post-treatment device 4 in front of the turbine 5 (see FIG. 1). The turbine intake temperature increases very quickly after the load step from a starting level to an increased level 108. If the exhaust gas post-treatment device 4 is arranged in the exhaust gas system 3 in front of the turbine 5, as shown in FIG. 1, a path of the turbine intake temperature as shown in the curve 105 results. The turbine intake temperature increases after the load step at the point of time T comparably slower and reaches the higher level 108 considerably later than without exhaust gas post-treatment device 4.

In FIG. 4 the charging-air pressure is shown on the ordinate 102 over the time on the abscissa 100, wherein the point of time of the load step is again designated with T. In this case the dashed curve 106 designates the increase of the charging-air pressure after the load step in an exhaust gas system 3 without exhaust gas post-treatment device 4, while the continuous curve 107 shows the delayed charging-air pressure increase, which is achieved, when the exhaust gas post-treatment device 4 is arranged in front of the turbine 5. Also here it is evident, that the charging-air pressure increases from an initial level to an increased level 109, wherein the increased level 109 in the case of the continuous curve 107 is achieved distinctly later than in the dashed curve 106.

In FIG. 5 the torque curves are registered on the ordinate 103 above the time on the abscissa 100 in a diagram. The dashed line 90 represents in this case, the desired torque, which corresponds to the torque demand 90 and is also designated as a driver demanded torque. At the point of time T a change of the desired torque 90 takes place onto a higher level, namely the load step. The curve designated with 91 represents the development of the first torque 91 of the combustion engine 1, which can only follow the torque demand 90 with a distinctive delay, as initially the charging-air pressure increase has to take place in the turbo-charger 6, as shown above by using FIGS. 3 and 4. The curve 92 describes the difference between the desired torque 90 and the first torque 91 of the combustion engine 1, which according to the invention is compensated by the second torque 94 of the additional drive means 2. The diagrams of FIGS. 3, 4 and 5 show, how the lacking transient behavior can be compensated by the second torque 94 of the additional drive means 2. The exhaust gas post-treatment device 4 in front of the turbine 5 dampens the temperature increase at the inlet of the turbine 5, whereby the charging-air pressure increase is only achieved slowly. By means of the slow charging-air pressure increase the increase of the injection amount is also slowed down. As a result, the first torque 91 of the combustion engine 1 increases only slowly and lags behind the desired torque 90. The torque difference 92 between the torque demand 90 and the first torque 91 of the combustion engine 1 can be used as a demand for the additional drive means 2. The second torque 94 of the additional drive means 2 is providable very quickly, especially in an electric motor 2 as additional drive means 2.

Figure 6:
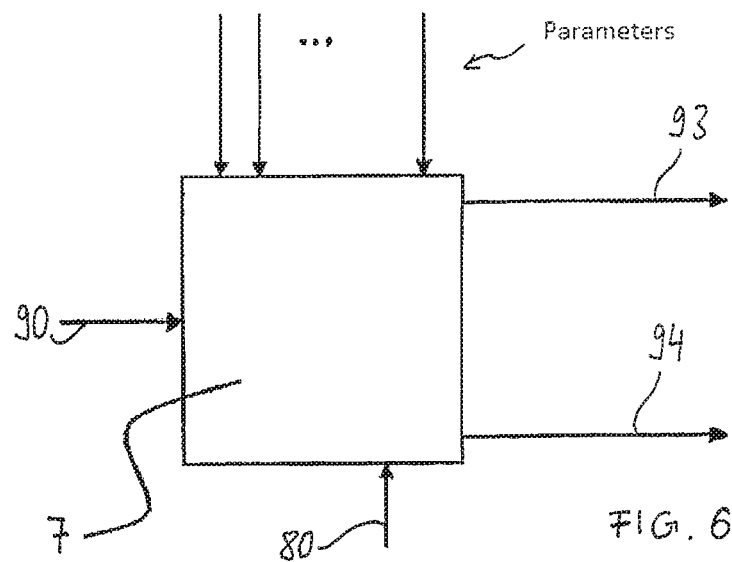

In FIG. 6 a control device 7 is shown schematically for adjusting an operating point of the drive 10 according to FIG. 1, wherein the control device 7 is connected to the combustion engine 1 and the additional drive means 2. According to specific algorithms it is verified, how the driver demanded torque 90 can be combined from the first torque of the combustion engine 1 and the second torque of the additional drive means 2 such, so that by means of specific desired values 93, 94 for the first torque and the second torque, specific optimization criteria are fulfilled. This can for example be done by a cost function, which predominantly evaluates minimal consumption but also the emission and combustion and driving noises and considers in this case also specific boundary conditions, like the current battery charge condition and the driving velocity. If necessary, also personal drive profiles, like for example a sportive or a slow drive manner or route data of a route, which was input earlier or determined or usual by means of GPS or other systems as drive profile can be considered in the total control of the torque distribution between the combustion engine 1 and the additional drive means 2. These parameters and boundary conditions are represented symbolically by the arrows designated with P. According to a preferred embodiment of the invention this function of the control device 7 can be expanded by a particle filter temperature 80 as a further parameter. Qualitatively, the function, which is used for distributing the desired values of the torque 93, 94, is influenced such, that at a low temperature 80 of the exhaust gas post-treatment device 4, a battery charging is favored. On the one hand by means of this, the load on the combustion engine 1 is increased, so that the temperature 80 of the exhaust gas post-treatment device 4 increases. On the other hand, the charging condition of the energy storage 8 for feeding the additional drive means 2 is increased. This is advantageous, as during a sudden load demand at a cold exhaust gas post-treatment device 4 a high second torque 94 of the additional drive means 2 is necessary for compensating the actual torque 91, which does not reach the desired value (see FIG. 5) of the combustion engine 1. When the temperature 80 of the exhaust gas post-treatment device 4 exceeds a desired temperature, a quick response of the turbo-charger 6 is ensured, so that the control device 7 as like the State of the Art, can carry out a for example fuel consumption optimized distribution of the desired torques 93, 94.

Figure 7:
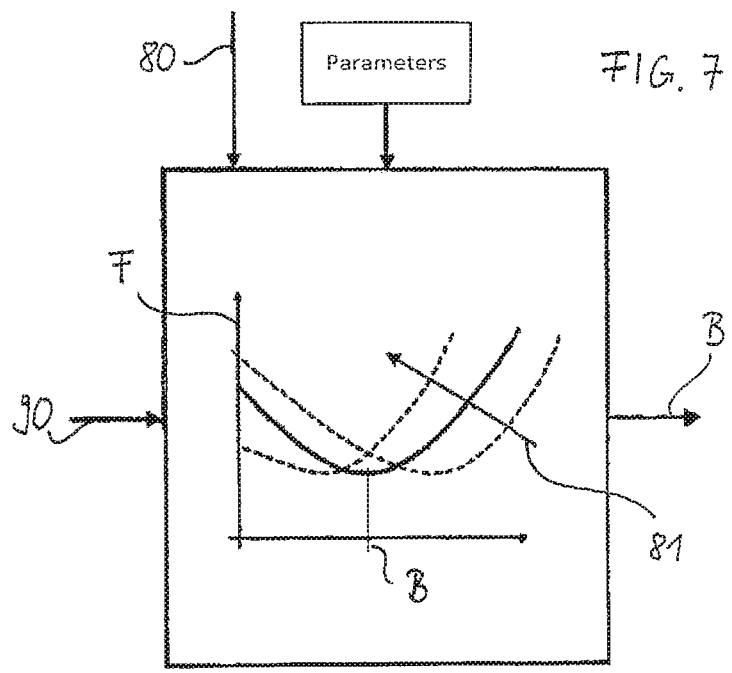

In FIG. 7 a schematical representation of an embodiment of the method according to the invention is shown, which corresponds to the function of the control device according to FIG. 6. Besides the torque demand 90, a multitude of parameters are processed in the control device 7, which are combined to P. By means of a cost function designated with P, an optimal operating point B can be determined, which is later transferred by the control 7 especially as a distribution of the torques 93, 94 (compare FIG. 6). The dashed shown function curves and the arrow 81 indicate in this case the influence of the temperature 80 of the exhaust gas post-treatment device 4 on the cost function F and thus also on the optimal operating point B, which can be determined with the respective function.

During a strongly transient drive operation of the vehicle 9, the compensation of the torque by the additional drive means 2 can lead to a quick draining of the storage device 8. A remedy for this is an additional function, which increases the specified charging condition of the storage device 8 in dependency of the temperature 80 of the exhaust gas post-treatment device 4 when falling below a desired temperature.

REFERENCE NUMERALS LIST 1 combustion engine
2 additional drive means, especially electro motor or flywheel mass
3 exhaust gas system
4 exhaust gas post-treatment device
5 turbine
6 exhaust gas turbo-charger
7 control device
8 energy storage
9 vehicle
10 hybrid drive
11, 12 clutches
32 arrow, exhaust gas flow direction
41 catalytic converter
42 particle filter
61 mechanical connection
62 supercharger
63 intake air feed
64 arrow, supercharged air feed
80 temperature of the exhaust gas post-treatment device
81 arrow
90 torque demand
91 first actual torque, curve
92 torque difference, curve
93 desired value of the first torque
94 second torque
100 abscissa
101, 102, 103 ordinates
104, 105, 106 curves
107, 108, 109 curves
A drive axle of the vehicle
G gearbox
B operating point of the drive
P parameter
F cost function
T point of time

The invention claimed is:

1. Hybrid drive for a vehicle, with a combustion engine and with at least one additional drive means,
wherein an exhaust gas system with an exhaust gas post-treatment device and a turbine of an exhaust gas turbo-charger is provided for discharging the exhaust gases of the combustion engine,
and wherein the exhaust gas post-treatment device is arranged in the exhaust gas system in flow direction of the exhaust gases in front of the turbine,
characterized in that a control device for adjusting an operating point of the hybrid drive is connected to the combustion engine and to the at least one additional drive means,
wherein the adjustment of the operating point is carried out such that a torque demand is met by a first torque of the combustion engine and a second torque of the at least one additional drive means.

2. Hybrid drive according to claim 1, characterized in that a temperature of the exhaust gas post-treatment device influences the adjustment of the operating point by the control device.

3. Hybrid drive according to claim 2, characterized in that at a temperature of the exhaust gas post-treatment device below a desired temperature, the adjustment of the operating point is carried out such by the control device, that at an increase of the torque demand a difference between the increased torque demand and the first torque of the combustion engine is compensable by the means of the second torque of the at least one additional drive means.

4. Hybrid drive according to claim 2, characterized in that at a temperature of the exhaust gas post-treatment device below a desired temperature the adjustment of the operating point is carried out such by the control device, that an energy storage for feeding the additional drive means is charged.

5. Method for operating a hybrid drive according to claim 1,
characterized in that a delayed response of the exhaust gas turbo-charger due to a heating-up of the exhaust gas post-treatment device to an increased torque demand is compensated such that a difference between the torque demand and the first torque of the combustion engine is provided by the second torque of the additional drive means.

6. Method according to claim 5, characterized in that a temperature of the exhaust gas post-treatment device is measured, wherein an operating point of the hybrid drive is adjusted in dependency of the measured temperature.

7. Method according to claim 6, characterized in that at a temperature of the exhaust gas post-treatment device below a desired temperature an energy storage for feeding the additional drive means is charged, as long as the torque demand is provided by the first torque of the combustion engine.

8. Method according to claim 6, characterized in that at a temperature of the exhaust gas post-treatment device above a desired temperature the operating point of the hybrid drive is adjusted in a consumption optimized manner.

9. A hybrid drive assembly for a vehicle, having a combustion engine and at least one additional drive motor, the drive assembly comprising:
an exhaust gas system for discharging exhaust gases of the combustion engine, the exhaust gas system having an exhaust gas post-treatment device and an exhaust gas turbo-charger having a turbine, wherein the gas post-treatment device is positioned upstream of the turbine in the direction of the flow of the exhaust gases, and
a control device for adjusting an operating point of the hybrid drive assembly, the control device being connected to the combustion engine and to the at least one additional drive motor, wherein the adjustment of the operating point by the control device is carried out such that a torque demand is met by a first torque of the combustion engine and a second torque of the additional drive motor.

10. The hybrid drive assembly according to claim 9, wherein a temperature of the exhaust gas post-treatment device influences the adjustment of the operating point by the control device.

11. The hybrid drive assembly according to claim 10, wherein the control device adjusts the operating point when the temperature of the exhaust gas post-treatment device is below a desired temperature, such that at an increase of the torque demand a difference between the increased torque demand and the first torque of the combustion engine is compensable by the second torque of the additional drive motor.

12. The hybrid drive assembly according to claim 10, wherein the control device adjusts the operating point when a temperature of the exhaust gas post-treatment device is below a desired temperature such that an energy storage device for feeding the additional drive motor is charged.

13. A method for operating a hybrid drive assembly according to claim 9 including the step of:
providing a second torque of the additional drive motor to compensate for a delayed response of the exhaust gas turbo charger due to a heating-up of the exhaust gas treatment device to an increased torque demand.

14. The method according to claim 13, including the steps of:
measuring the temperature of the exhaust gas post-treatment device; and
adjusting the operating point of the hybrid drive in response to the measured temperature.

15. The method according to claim 14, including the step of:
charging an energy storage device for feeding the additional drive motor when the temperature of the exhaust gas post-treatment device is below a desired temperature, as long as the torque demand is provided by the first torque of the combustion engine.

16. The method according to claim 15, comprising the step of:
adjusting the operating point of the hybrid drive in a consumption optimized manner when the temperature of the exhaust gas post-treatment device is above a desired temperature.

* * * * *